Figure 1:
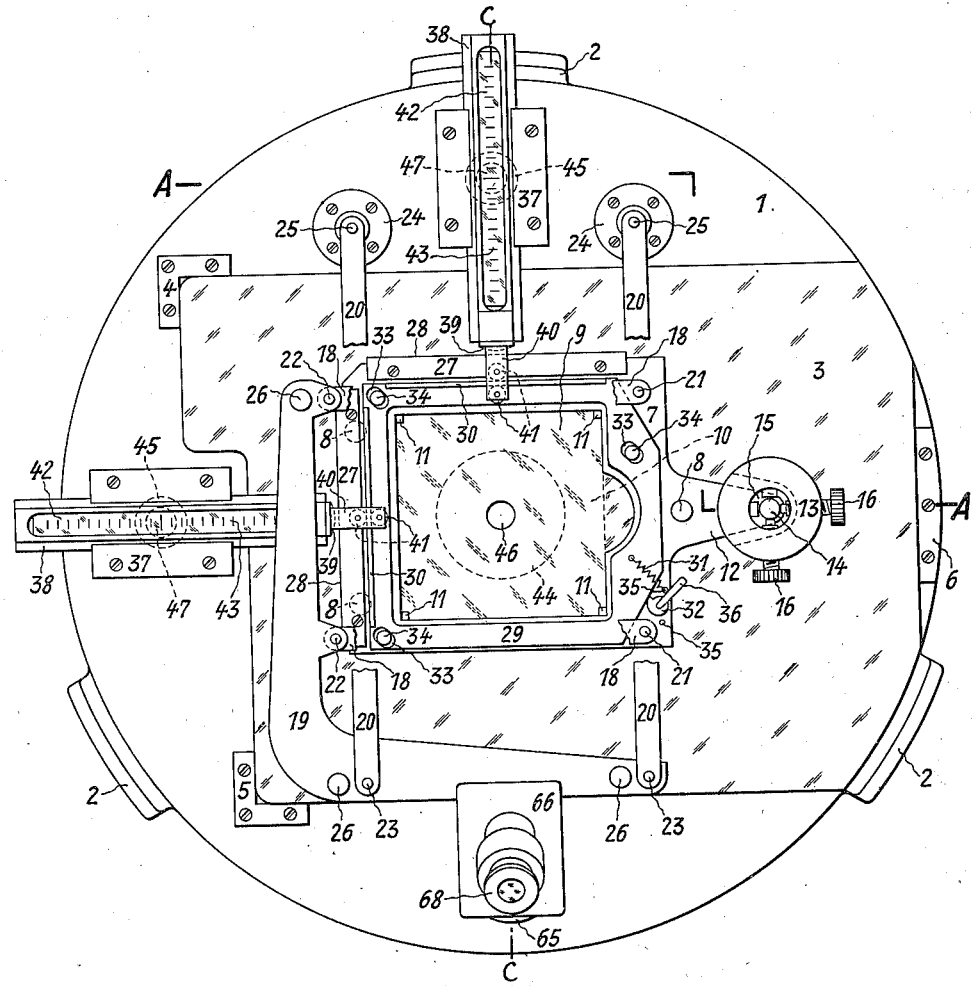

Sept. 3, 1935.   F. MEYER   2,013,165
MEASURING DEVICE
Filed Nov. 29, 1927   2 Sheets-Sheet 1

Inventor:

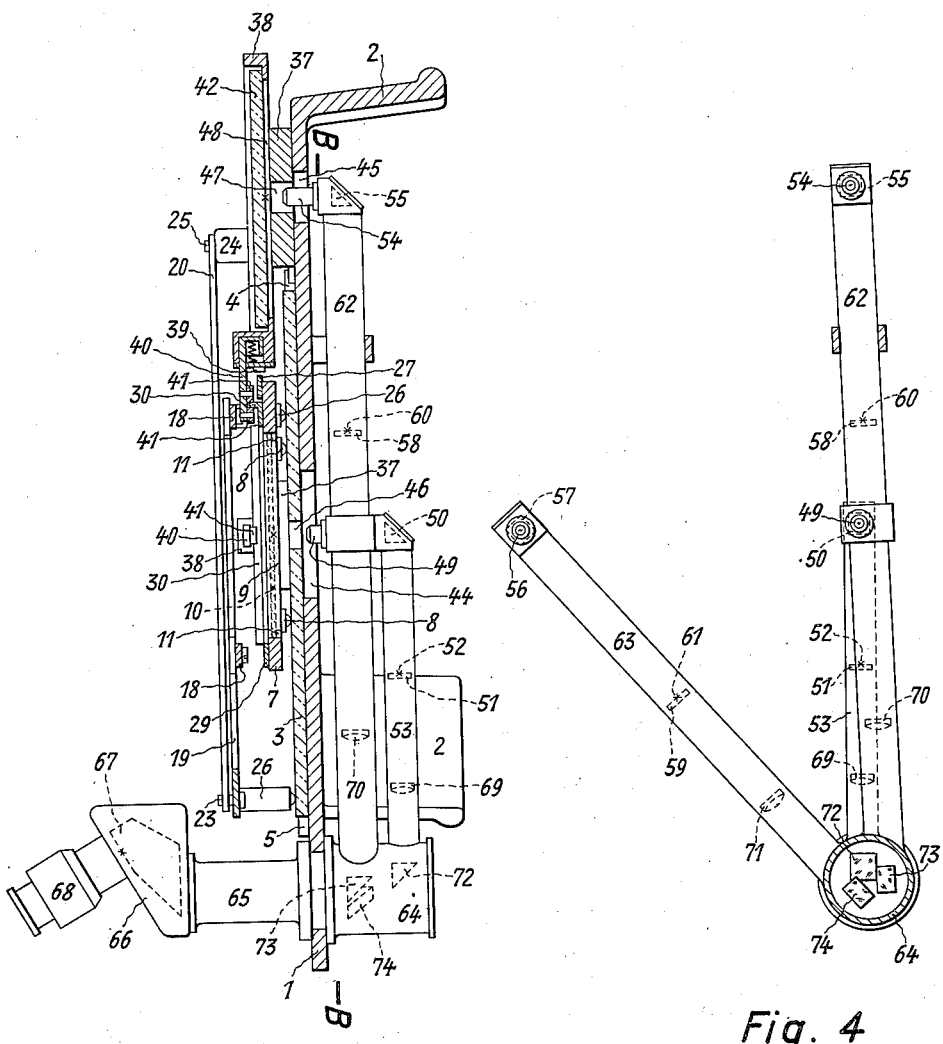

Patented Sept. 3, 1935

2,013,165

UNITED STATES PATENT OFFICE 2,013,165

MEASURING DEVICE

Franz Meyer, Jena, Germany, assignor to the firm of Carl Zeiss, Jena, Germany

Application November 29, 1927, Serial No. 236,574
In Germany December 3, 1926

6 Claims. (Cl. 33—76)

I have filed an application in Germany, December 3, 1926.

For the solution of the problem of exactly measuring the parallel-coordinates, i. e. the rectangular or the oblique coordinates of the points of a plane surface, e. g. of measuring photographic star exposures for astronomical purposes one has generally used a measuring device in which cross wires, connected to two rules whose divisions were lying in a common plane, was brought into coincidence with each of the points to be measured, whereby the rules were displaced along the axial directions of the coordinate system relatively to a measuring mark each, denoting a point. The greater the distance of a point to be measured from the projection of the point of intersection of two parallel lines to the coordinate axes through the points, denoted by the measuring marks, upon the plane, parallel to the plane of the divisions of the rules and traversing the point to be measured, the greater was also the error in measurement which resulted if the surface to be measured in the course of the measurements did not remain exactly parallel to its original position. Further errors took place if the surface to be measured was not disposed exactly parallel to the plane determined by the division of the rule or if the rules were not freely movable in their guides.

With the present invention the aforesaid errors are avoided. This result has been attained by providing the measuring device according to the invention with a fixed mark, which, as a measuring position of the points to be measured, denotes the projection of the point of intersection of the two straight lines parallel to the axial directions of the coordinate system, determined by the points denoted by the measuring marks, upon a plane parallel to the plane of the divisions of the rules. The device thus constructed may be further improved in order to lessen angular errors, due to differences in height, by causing the point denoted by the fixed mark, consequently the surface to be measured, to lie in the plane of the divisions of the rules themselves. Besides, it is advisable to provide the device with a guide-surface parallel to this plane on which the body, carrying the plane plate the surface of which is to be measured, is displaceable by means of a parallel guide in such a way that the points of the surface to be measured describe the plane, determined by the two divisions of the rules. With a device of such construction the various aforesaid angular errors can only affect the results of measurement by amounts which cannot even be noticed in the event of an exceedingly high accuracy of measurement. As a parallel guide there is used best a constructional form based upon the use of two link-parallelograms.

The leading advantage for the construction of such a device therefore consists in this, that the surface to be measured can at any one time be brought into the position best suited for the measurement, whereby the rules are simultaneously displaced by the coordinate values corresponding to these displacements. The device is suitably provided with two guide-rulers, embracing the angle of the coordinate axes and being displaceable with the body carrying the surface to be measured and whose guide-edges act upon a feeling member each, connected to one of the rules, in such a way that the adjustments of the rules effected by the displacement correspond to the coordinate values of the point of the body adjusted at any one time. Thereby it is advisable to prevent the feeling members from being in contact with the rules during all motions because in that case, even with a very careful execution and hardened material, wearing defects would soon result. It is therefore suitable to provide the device with two auxiliary rulers, coupled to the rules and parallel to the guide-rulers, whose distance from the latter is variable whereby the contact of the feeling members with the guide-rulers may be temporarily suspended. In order to save the parts serving for the measurement proper as much as possible, it is advisable to generally suspend the contact of the feeling members with the guide-rulers by varying the distance of the auxiliary rulers and only to allow it to take place while the results of measurement are read off.

By using material marks as measuring marks and as a fixed mark it would not be possible to avoid the appearance of parallaxes between the marks and the points to be denoted by them, which lie in the plane of division of the movable rules and in the plane of the likewise movable surface to be measured respectively. Apart from the source of errors due to this parallax a largest possible approximation of the marks to these surfaces would already be disadvantageous because owing to the motions, to be carried out prior to the measurements, these surfaces may easily be injured by the marks themselves or perhaps by dust particles and the like sticking to the marks. It is therefore advisable to use optical resources known in themselves by means of which it is possible to attain a coincidence, free from parallaxes, of the marks with the images of the respective surfaces. The device is suitably improved by three optical systems, which yield a real image of the divisions of the rule and the surface to be measured, the two measuring marks and the fixed mark being disposed in the corresponding image planes. The device becomes particularly handy and the measurement is greatly facilitated if the three adjusting and measuring observations, necessary at any one time, may simultaneously take place at one place of the device without the necessity of carrying out after each observation a motion of the head by which one loses sight of the adjustment which has just been carried out. In order to attain this simplification one may provide additional optical systems by which the images of the divisions of the rules with the measuring marks and the surface to be measured with the fixed mark are imaged side by side into a common plane, so that they can be simultaneously observed with the aid of an observation appliance, e. g. an ocular or the like.

Figure 2:
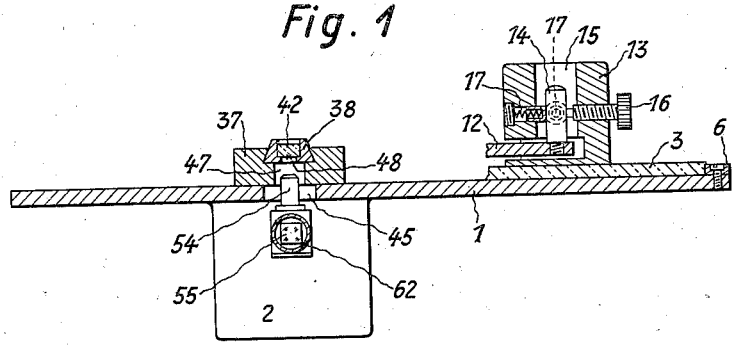

The annexed drawings show as a constructional example of the invention a device for measuring the rectangular coordinates of the points of a photographic plate (e. g. an astronomical star exposure). Fig. 1 shows the device from above in a plan, Fig. 2 shows in an elevation a partial section on the line A—A of Fig. 1. Fig. 3 represents in a side elevation a cross section on the line C—C of Fig. 1 and Fig. 4 in a plan a partial section on the line B—B of Fig. 3.

The device has a circular base plate 1 with three feet 2. On this base plate 1 rests between three holders 4, 5 and 6 a glass plate 3 whose surface is ground plane and polished and serves for guiding a frame 7 which is supported thereon with three spherical feet 8 and which has a square aperture 9 of the size of the plate 10 to be measured. In the corners of this aperture 9 there are provided four projections 11 in such a way that their surfaces, on which rests the plate to be inserted, lie in a plane parallel to the surface of the glass plate 3. The frame 7 has a projection 12 which engages in a weight 13. A bolt 14 is carried by projection 12 and extends into a recess 15 of the weight 13. Two set-screws 16 and countersprings 17 permit adjustment of 14 relatively to 13. The frame 7 is provided with a parallel guide, consisting of two links 18, an angular link 19 and two additional links 20. The links 18 are pivoted by pivots 21 to the frame 7 and by two pivots 22 to the link 19. The latter carries two additional pivots 23 whose connecting line is perpendicular to that of the pivots 22 and to which the links 20 are pivoted. The links 20 are pivoted on two pivots 25 supported in head-pieces 24 of the base plate 1. The pairs of pivots 21 and 22 on the one hand and 23 and 25 on the other hand form the corner-points of two parallelograms of the said links. The angular link 19 is supported on the glass plate 3 at three points by spherical feet 26.

To the frame 7 there are screwed two rulers 27 in such a way that their guide-edges 28 are exactly perpendicular to each other. Parallel to these guide-edges 28 there are provided on a sliding frame 29 two auxiliary rulers 30 whose distance from the rulers 27 may be slightly varied by diagonal displacement of the sliding frame 29 by means of a cam disc 32 coupled thereto by a draw spring 31, whereby the sliding frame 29 is guided on three guide bolts 34 by means of three slots 33 and provision is made for the limitation of the angle of rotation of the cam disc 32 by two stop pins 35 against which a handle 36 contacts. Two sliding carriages 38 are displaceable in carriage guides 37, perpendicular to the guide-edges 28. The sliding carriages carry at their ends feeling members 39, facing the guide-edges 28 of the rulers 27, and furthermore resiliently supported roller-carriers 40 which are guided on the auxiliary rulers 30 by two rollers 41 each. The distance of the rollers 41 from the feeling members 39 is so chosen that with that adjustment of the sliding frame 29 in which the distance of the auxiliary rulers 30 from the rulers 27 has the smallest value the contact of the feeling members 39 with the rulers 27 is suspended. Into the sliding carriages 38 there are embedded glass rods 42, having a rectangular cross section and whose lower surfaces lie in the plane of the surfaces of the projections 11 and are provided with longitudinal scales 43.

The base plate 1 is pierced at three places; the bores are cylindrical and one bore 44 lies at the centre of the base plate 1, while two bores 45 are underneath the carriage guides 37, respectively. The glass plate 3 has a recess 46 concentric with the bore 44; to the bores 45 correspond recesses 47 of the carriage guides 37 and longitudinal slots 48 of the sliding carriages 38.

The zero point of the coordinate system upon which the measurements are based is at the point of intersection of the axis of the recess 46 with the plane, determined by the surfaces of the projections 11. This point is imaged by a microscope objective 49, disposed below the glass plate 3 concentrically with the recess 46, and a reflecting prism 50 on the plane-parallel glass plate 51 which bears a fixed mark 52, denoting the optical axis of this system mounted in a casing 53. The axes of the carriage-guides 37 lying in the planes of the longitudinal scales 43 intersect at the zero point of the coordinates and are thus the coordinate axes. One point each of these axes is imaged on a plane-parallel glass plate 58 and 59 respectively by a microscope objective 54 and a reflecting prism 55, a microscope objective 56 and a reflecting prism 57, whereby these images again lie at any one time on the optical axes which are denoted by measuring marks 60 and 61 respectively. The optical system 54, 55, 58 is mounted in a casing 62, the optical system 56, 57, 59 in a casing 63. The casings 53, 62 and 63 are inserted at one end in a prism casing 64 which is fixed opposite a tube 65 on the base plate 1. Above the tube 65 is disposed a prism casing 66 in which is supported a prism 67, containing two reflecting surfaces and which allows a pencil of luminous rays, entering through the tube 65, to emerge at an inclination of about 30°. Its light-exit surface falls into the focal plane of an ocular 68 in which there are imaged side by side the fixed mark 52 and the measuring marks 60 and 61 together with the images of the plate 10 to be measured and the longitudinal scales 43 by means of collective systems 69, 70 and 71 respectively and reflecting prisms 72, 73 and 74 respectively. The images produced on the light-exit surface of the prism 67 may consequently be simultaneously observed by the ocular 68.

The longitudinal scales 43 are suitably constructed so that the zero point of the scales will coincide with the measuring marks 60 and 61 when the centre of the frame 7 coincides with the fixed mark 52. The measurements then yield the coordinates of the points of the plate 10 related to the zero point of the coordinates.

The measurements should be carried out in the following way. After the plate 10 to be measured has been placed with its layer-side on the projections 11, the observer assumes his position at the ocular 68 and manually displaces the weight 13 with the frame 7, which is displaceable with the aid of the spherical feet 8 on the glass plate 3 owing to the action of the parallel guide, until the point to be measured approximately falls into the axis of the recess 46. For the fine adjustment of the image of the point for the fixed mark 52 one uses the screws 16 while the weight 13 is stationary. With all movements of the frame 7 it is necessary to adjust the sliding frame 29 by means of a corresponding adjustment of the handle 36 in such a way relatively to the frame 7 that the auxiliary rulers 30 have the shortest distance from the rulers 27 and that consequently the contact of the feeling members 39 with the rulers 27 is suspended. Because of the guide of the sliding carriages 38 by the rollers 41 on the auxiliary rulers 30 the glass rods 42 are displaced by the longitudinal scales 43 with all components of movements of the frame 7 parallel to the respective carriage guides 37.

If the point to be measured has now been exactly adjusted relatively to the fixed mark 52, the feeling members 39 are brought into contact, by turning over the handle 36, with the guide edges 28 of the rulers 27 against which they always bear under the action of the spring 31 at the same measuring pressure. The values of the scales 43, corresponding to the measuring marks 60 and 61, which are read off in the ocular 68 are the coordinates sought of the point, to be measured, on the plate 10. In the same manner it is now possible to repeat the measuring process for the remaining points, to be measured.

I claim:

1. In a device for measuring the Cartesian coordinates of points of a plane plate, a base plate, a measuring mark fixed relatively to said base plate, a carrying frame adapted to receive said plane plate, means connecting said frame with the base plate for sliding movement thereover so that each linear element of the plane plate moves parallel to itself, two carriages disposed on the said base plate, means restricting each carriage to straight-line movement parallel to said plane plate, the two lines of movement being parallel respectively to the coordinate axes, an indicating device for each carriage, each device comprising two parts, a scale and a cooperating index, one part being connected to move with its carriage and the other part being fixed relatively to the base plate, those parts moving with the carriages lying in a common plane parallel to said plane plate, and means for holding said carriages in contact with said frame.

2. In a device for measuring the Cartesian coordinates of points of a plane plate, a base plate, a measuring mark fixed relatively to said base plate, a carrying frame adapted to receive said plane plate, means connecting said frame with the base plate for sliding movement thereover so that each linear element of the plane plate moves parallel to itself, two carriages disposed on said base plate, means restricting each carriage to straight-line movement parallel to said plane plate, the two lines of movement being parallel respectively to the coordinate axes, an indicating device for each carriage, each device comprising two parts, a scale and a cooperating index, one part being connected to move with its carriage and the other part being fixed relatively to the base plate, those parts moving with the carriage lying in the plane determined by the surface to be measured of said plane plate, and means for holding said carriages in contact with said frame.

3. In a device for measuring the Cartesian coordinates of points of a plane plate, a base plate, a measuring mark fixed relatively to said base plate, a guiding plate on said base plate, a carrying frame adapted to receive said plane plate, means connecting said frame with the guiding plate for sliding movement thereover so that each linear element of the plane plate moves parallel to itself, the said connecting means comprising two link-parallelograms, two carriages disposed on said base plate, means restricting each carriage to straight-line movement parallel to said plane plate, the two lines of movement being parallel respectively to the coordinate axes, an indicating device for each carriage, each device comprising two parts, a scale and a cooperating index, one part being connected to move with its carriage and the other part being fixed relatively to the base plate, those parts moving with the carriage lying in a common plane parallel to said guiding plate, and means for holding said carriages in contact with said frame.

4. In a device for measuring the rectangular Cartesian coordinates of points of a plane plate, a base plate, a measuring mark fixed relatively to said base plate, a guiding plate on said base plate, a carrying frame adapted to receive said plane plate, means connecting said frame with the guiding plate for sliding movement thereover so that each linear element of the plane plate moves parallel to itself, two carriages disposed on said base plate, means restricting each carriage to straight-line movement parallel to said plane plate, the two lines of movement being parallel respectively to the coordinate axes, an indicating device for each carriage, each device comprising two parts, a scale and a cooperating index, one part being connected to move with its carriage and the other being fixed relatively to the base plate, those parts moving with the carriages lying in a common plane parallel to said guiding plate, two mutually-normal guide rulers carried by said frame, and two feeler members each fixed to its carriage and adapted to engage a respective guide ruler.

5. In a device according to claim 4, a sliding frame and two auxiliary rulers disposed parallel to the said two guide rulers, respectively, the said sliding frame carrying these auxiliary rulers, the said auxiliary rulers being adapted to move the said sliding frame for moving the said feeler members and the said guide rulers out of contact.

6. In a device according to claim 1, a weight displaceable along the surface of said base plate, and means connecting said frame and weight to effect adjustment of the frame relatively to the weight.

FRANZ MEYER.